United States Patent [19]

Imao et al.

[11] Patent Number: 4,729,605
[45] Date of Patent: Mar. 8, 1988

[54] MULTIPLEX SPOKE FOR WHEEL

[75] Inventors: Shoji Imao; Hitoshi Kodama; Yozo Chiba, all of Aichi, Japan

[73] Assignee: Mitsubishi Rayon Co., Ltd., Tokyo, Japan

[21] Appl. No.: 744,948

[22] Filed: Jun. 17, 1985

[30] Foreign Application Priority Data

Jun. 18, 1984 [JP] Japan ................. 59-90449[U]

[51] Int. Cl.$^4$ ................................. B60B 5/00
[52] U.S. Cl. ................. 301/104; 301/63 PW; 301/55; 301/58
[58] Field of Search ............ 301/104, 58, 59, 63 PW, 301/55, 61

[56] References Cited

U.S. PATENT DOCUMENTS

| | | | |
|---|---|---|---|
| 396,461 | 1/1889 | Bolick | 301/104 |
| 703,029 | 6/1902 | Wilske | 301/104 |
| 1,280,646 | 10/1918 | Billhartz | 301/104 |
| 1,433,435 | 10/1922 | Van Horn | 301/59 |
| 4,146,274 | 3/1979 | Lejeune | 301/63 PW |
| 4,527,839 | 7/1985 | Fujitaka et al. | 301/63 PW |

FOREIGN PATENT DOCUMENTS

| | | | |
|---|---|---|---|
| 37321 | of 1886 | Fed. Rep. of Germany | 301/61 |
| 59-67104 | 4/1984 | Japan | 301/63 PW |
| 2929 | of 1897 | United Kingdom | 301/55 |
| 2093778 | 9/1982 | United Kingdom | 301/63 PW |
| 2112721 | 7/1983 | United Kingdom | 301/63 PW |

*Primary Examiner*—David A. Scherbel
*Assistant Examiner*—Carol L. Olson
*Attorney, Agent, or Firm*—Oblon, Fisher, Spivak, McClelland & Maier

[57] ABSTRACT

A multiplex spoke having metal parts at both ends of its fiber reinforced rod and an external thread portion at the end of one part is fitted to a rim for coupling the metal part to a nipple.

11 Claims, 6 Drawing Figures

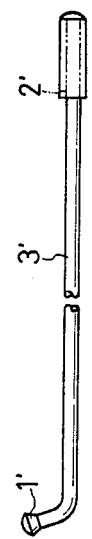
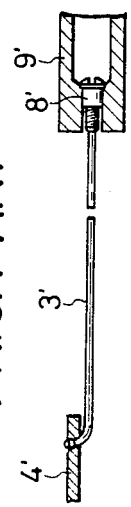
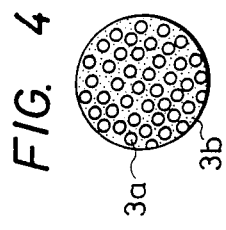
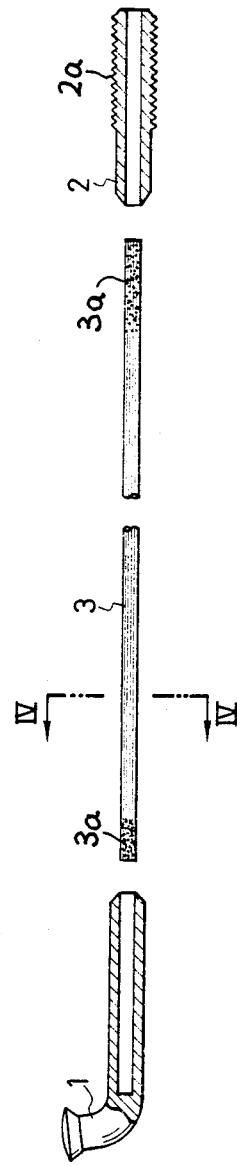

MULTIPLEX SPOKE FOR WHEEL

BACKGROUND OF THE INVENTION

1. Field of the Invention

This invention relates to a wheel consisting of a tire, a tube, a rim, spikes, nipples and a hub for a bicycle and the like, and more particularly, to a multiplex spoke having a wire rod especially prepared from tow fiber reinforced plastics.

2. Description of the Related Art

Not only the weight of a rider and a load, but also the shocks produced while a bicycle is ridden on the ground, are applied to the wheels thereof and, particularly when the tire is punctured, a large impact is directly applied to the rim. Even in such a case, the wheel must be rigid and strong enough to be free from plastic deformation and damage for safety reasons.

As the wheel is an annulus having a relatively large radius, the angular moment of inertia is large, which requires considerable effort if the bicycle speed is to be abruptly changed while it is traveling. For this reason, there is a need in sporting or long distance bicycles, which are often subjected to sharp changes in travel speed, to have wheels which are particularly lightweight.

In order to overcome the above problems and to produce strong and lightweight wheels, there have been continuous efforts to strengthen, and reduce the weight of bicycle wheels since they were developed in the 1870's.

Although metals such as mild steel, stainless steel and titanium alloy have been used to make spokes for wheels, there is a limit to the reduction in the weight of the spoke when its strength is taken into consideration. Naturally, attempts have been made to utilize fiber reinforced plastics (hereinafter simply called the "FRP") for weight reducing purposes. However, because the FRP is generally easily affected by a local shear load, it is not applicable to the spoke portion where the spoke is screwed in the hub or the rim, to couple them together.

To solve this problem, Japanese Laid-open patent publication (Kokai) No. 51-135040 "Spoke for Wheel" discloses a method for using the FRP in the wire rod portion and metal fittings respectively at both ends of a spoke. The method is characterized by providing a junction of a spoke and a rim incorporating a rim nut and, when they are assembled, inserting the head metal fitting into the spoke hole in the hub first and then turning the rim nut to obtain spoke tension. However, the shear rigidity coefficient of the FRP formed by uniformly drawing fibers in the longitudinal direction is roughly 500 kg/mm² at most, and the wire rod is twisted, transformed and wrenched off by screwing torque before a tension of 80~100 kg is normally obtained. Thus the aforesaid arrangement cannot be put to practical use.

SUMMARY OF THE INVENTION

An object of the present invention is to provide a spoke which is lightweight, strong and durable enough to bear up against extremely hard riding conditions, with such a construction as to permit simple assembly.

The substance of the present invention for accomplishing the aforementioned object is that a multiplex spoke for a bicycle wheel comprises a wire rod portion made of the FRP and metal fittings at both its ends, the metal fitting at the junction of the spoke and the rim being of external thread construction wherein the spoke is held in its place with a rim nut, so that no torsional torque is applied to the FRP in the form of a rod.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a side view of a conventional spoke;

FIG. 2 is a partially broken side view illustrating the structure of a spoke fitted in a conventional manner;

FIG. 3 is an exploded assembly diagram of an embodiment of a spoke according to the present invention;

FIG. 4 is an enlarged cross sectional view taken on line IV—IV of FIG. 3;

DETAILED DESCRIPTION OF THE PREFERRED EMBODIMENTS

Figure 5:
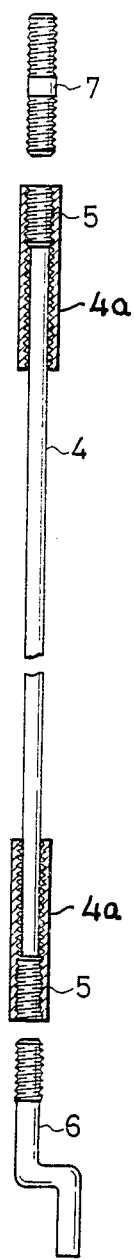
FIG. 5 is a cross sectional view of an another embodiment of the present invention illustrating a different structure of metal fittings at both ends of a spoke.

Referring now to the accompanying drawings, the present invention will be described.

FIGS. 1 and 2 show a conventional spoke and spoke-fitting construction. As shown in FIG. 1, the spoke has a head portion 1', an external thread portion 2' and a wire rod portion 3', these portions being unitarily formed using mild steel, stainless steel or the like. The head 1' of the spoke is engaged with a wheel hub 4', whereas the external thread 2' is fitted to a nipple presser foot 9' of a rim (not shown) through a nipple 8'.

Referring to FIGS. 3 and 4, an embodiment of the present invention will subsequently be described.

FIG. 3 shows an example of a spoke according to the present invention.

The spoke according to the present invention has a head portion 1 and an external thread portion 2 prepared from metal materials, and also a wire rod portion 3 made of fiber reinforced plastics and used to couple the head portion 1 and the external thread portion 2 having external thread 2a. In this case, importance is especially attached to the external thread portion 2 provided at the end of a metal part fittable via the thread portion to the rim nipple on the rim side of the spoke.

A stainless steel rod 2.5 mm in diameter is used to form the head portion 1, which is so processed as to provide a head, a curved portion and a hole 30 mm long for fitting the rod 3 therein.

A stainless steel rod 2 mm in diameter is used to form the external thread portion 2, which is then so processed as to provide a hole for fitting the rod 3 therein and a screw thread in its outer periphery.

FIG. 4 shows a cross sectional view of the rod portion 3 illustrating reinforcing fibers 3a impregnated in a binding agent 3b.

As reinforced fibers in the rod portion 3, use can be made of inorganic tow fibers such as boron fibers, silicon carbide fibers, titanic acid kali fibers or glass fibers, or organic tow fibers such as carbon fibers or aromatic polyamide fibers.

The tow fibers are impregnated with a binding agent to prepare a matrix material. By the matrix material is meant one whose construction has incorporated the reinforced fiber (dispersion phase) and the binding agent (continuous phase) in a body. As a binding agent, use can be made of an inorganic binding agent such as an aluminum light alloy or tinanium alloy, or an organic binding agent such as a thermoplastic polybutylene terephthalate, polycarbonate, nylon, polyethylene terephthalate, polyacetal, polyethersulfone or polysulfone resin in addition to a thermosetting epoxy, unsaturated polyester, vinylester, polyimide or phenol resin. Since the present invention is intended to make a spoke which is readily moldable and lightweight, it is preferred to use an organic binding agent.

During formation of the matrix material, reinforced fibers impregnated with a binding agent are normally subjected to a wire drawing operation.

Subsequently, the oil content of the ends of the rod portion 3 is completely removed and both ends of the rod portion 3 are coated with Araldite AW106/HV9-53U (the trademark for an epoxy adhesive agent made by Ciba Geigy Co.) adhesive 3a before being inserted into the holes made in the head portion 1 and the external thread portion 2, respectively. The assembly is then put into an oven and heated at 120° C. for 10 minutes and hardened to complete a multiplex spoke.

In so doing, an extremely lightweight multiplex spoke becomes obtainable.

The success in the manufacture of such a lightweight spoke is attributed to the use of fiber reinforced plastics for the rod portion 3 which is not needed to provide relatively high strength, whereas the head portion 1 and the external thread portion 2 which must provide higher strength are made thick by metal reinforcement due to head portion 1 and thread portion 2. Moreover, because the spoke as a whole is so arranged as to have uniform strength, it can be far lighter than a conventional one.

It has also been proved that if steel wires are arranged in the core of the reinforced plastic rod portion 3, the spoke will not be cut in pieces should it be broken and will better resist impulsive loads.

If aromatic polyamide fibers are arranged in the external layer of the wire rod portion 3, it will have increased resistance against breakage caused by tensile stress while the bicycle is made to travel.

Description will subsequently be given of an embodiment having metal parts of modified construction at both ends of a multiplex spoke.

Figure 6:
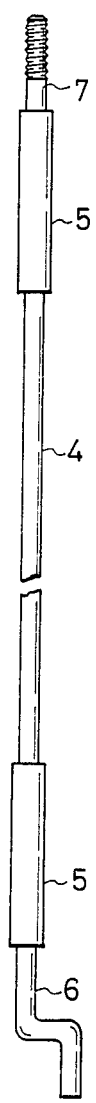
FIG. 6 shows the structure of FIG. 5 in an assembled state.

As shown in FIGS. 5 and 6, the spoke is formed of a combination of a rod 4 made of a fiber reinforced material and metal tubes 5 respectively coupled to both ends of the rod 4 by adhesives 4a. Each metal tube 5 incorporates a junction with the rod 4 and an internal thread portion. A metal fitting 6 or third metal part incorporates a crank engaged with a wheel hub and an external thread portion which is fitted to the internal thread portion provided in one metal tube. The metal fitting 6 is coupled to the end of the internal thread portion via the thread and an adhesive agent. A metal fitting 7 incorporates an external thread portion coupled to a wheel rim nipple and another external thread portion fitted to the internal thread portion provided in the outer tube 5. The metal fitting 7 is coupled to the end of the internal thread portion via the thread and an adhesive agent.

Since the metal fittings being coupled to both ends of the rod 4 according to the present invention are supplied with throughholes, no air reservoir is formed in the fittings and thus no air escape resulting in reduction of spoke strength is required. Accordingly, the problems that have heretofore been posed can be solved, so that the process of manufacturing spokes is not only simplified but also facilitated because identical metal fittings are used at both ends thereof.

EXAMPLE 1

In reference to the construction shown in FIG. 3, stainless steel was used to prepare a head portion 1 and an external thread portion 2 and a combination of reinforced fibers tradenamed Pyrofil ™ (carbon fibers made by Mitsubishi Rayon Co.) and a binding agent of vinylester resin were used to make a spoke 1.5 mm in diameter to test the strength thereof. Although it was as light as 3 g. a cut load of 350 Kg. was obtained. In comparison, JIS (the Japanese Industrial Standard) provides minimum cut loads of 210 Kg and 330 Kg in the case of spokes having diameters of 1.8 mm and 2.3 mm for bicycles, respectively. Since a spoke weighs 7 g. in the case of the lightest ordinary sporting bicycle, given that the number of spokes per wheel is 36, it is possible to reduce the weight of a wheel by 144 g.

EXAMPLE 2

In reference to the embodiment of FIGS. 5 and 6, reinforced fibers of Pyrofil ™ (carbon fibers made by Mitsubishi Rayon Co.) impregnated with vinylester resin as a binding agent were subjected to wire drawing to form a wire rod portion 4 and glued to metal fittings made of SUS304 with an epoxy adhesive agent (Araldite AW106/HV953U made by Ciba Geigy Co.). The spoke tension test resulted in a tension strength of 260 Kg, whereas its weight was 4 g. As a #14 steel spoke 301 mm long weighs 7 g., the aforesaid arrangement according to present invention has accomplished weight reduction by approximately 110 g. per wheel having 36 spokes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiplex wheel spoke for a bicycle, comprising:
   a fiber reinforced plastic rod having two ends;
   a first metal part non-adjustably adhesively fixed to one end of said rod,
   a second metal part non-adjustably adhesively fixed to the other end of said rod,
   wherein one of said first and second metal parts is provided with a first external screw thread adapted to be threaded into a rim of a wheel, whereby said spoke can be attached to a wheel hub and a wheel rim without subjecting the spoke to excessive shear stresses.

2. The multiplex spoke as claimed in claim 1, including steel wires arranged in the core of said rod.

3. The multiplex spoke as claimed in claim 1, wherein said fiber reinforced rod is made of carbon fiber reinforced plastics.

4. The multiplex spoke as claimed in claim 1, wherein aromatic polyamide fibers are arranged in an external layer of said fiber reinforced rod.

5. The multiplex spoke of claim 1 including a bore in each said metal part into which an end of said rod may be inserted, and a curable adhesive bonding each said end in said bore.

6. The multiplex spoke of claim 1, wherein said means for fixing comprise:
   an internally threaded metal tube for each said end of said rod and into which a respecive end of said rod may be inserted;
   second external screw threads for each of said metal parts, said second screw threads being matably threaded into said internal screw threads of said metal tubes, and
   a curable adhesive bonding each said rod end in said tube and bonding each said metal part in one said tube.

7. The multiplex spoke of claim 5, including a third metal part which is curved and headed so as to engage a wheel hub.

8. The multiplex spoke of claim 6 including a third metal part which is crank shaped so as to engage a wheel hub.

9. The multiplex spoke as claimed in claim 8, including steel wires arranged in the core of said fiber reinforced rod.

10. The multiplex spoke as claimed in claim 8, wherein carbon fiber reinforced plastics are used to form said fiber reinforced rod.

11. The multiplex spoke as claimed in claim 8, wherein aromatic polyamide fibers are arranged in an external layer of said fiber reinforced rod.

* * * * *